United States Patent [19]
Gulick

[11] 3,727,523
[45] Apr. 17, 1973

[54] SPRING RETURN CARTRIDGE
[75] Inventor: Ronald A. Gulick, Sugarland, Tex.
[73] Assignee: Research Engineering Company, Houston, Tex.
[22] Filed: May 7, 1971
[21] Appl. No.: 141,217

[52] U.S. Cl. ................92/130, 74/89.15, 267/168
[51] Int. Cl. ..........................................F01b 31/00
[58] Field of Search.................92/130, 138, 166, 92/128; 251/229; 267/166, 168, 169; 74/89.15, 509, 104, 107

[56] References Cited

UNITED STATES PATENTS 1,517,728  12/1924  Heath..................................92/130

FOREIGN PATENTS OR APPLICATIONS 774,020  5/1957  Great Britain......................74/89.15
657,318  9/1951  Great Britain......................267/168

*Primary Examiner*—Charles J. Myhre
*Assistant Examiner*—Ronald H. Lazarus
*Attorney*—Robert W. B. Dickerson

[57] ABSTRACT

An actuator of the type having a spring return portion, wherein the cylinder containing the spring forms a cartridge interchangeable on the housing with other cartridges, and the cartridge is so constructed as to negate the need for venting to atmosphere.

3 Claims, 4 Drawing Figures

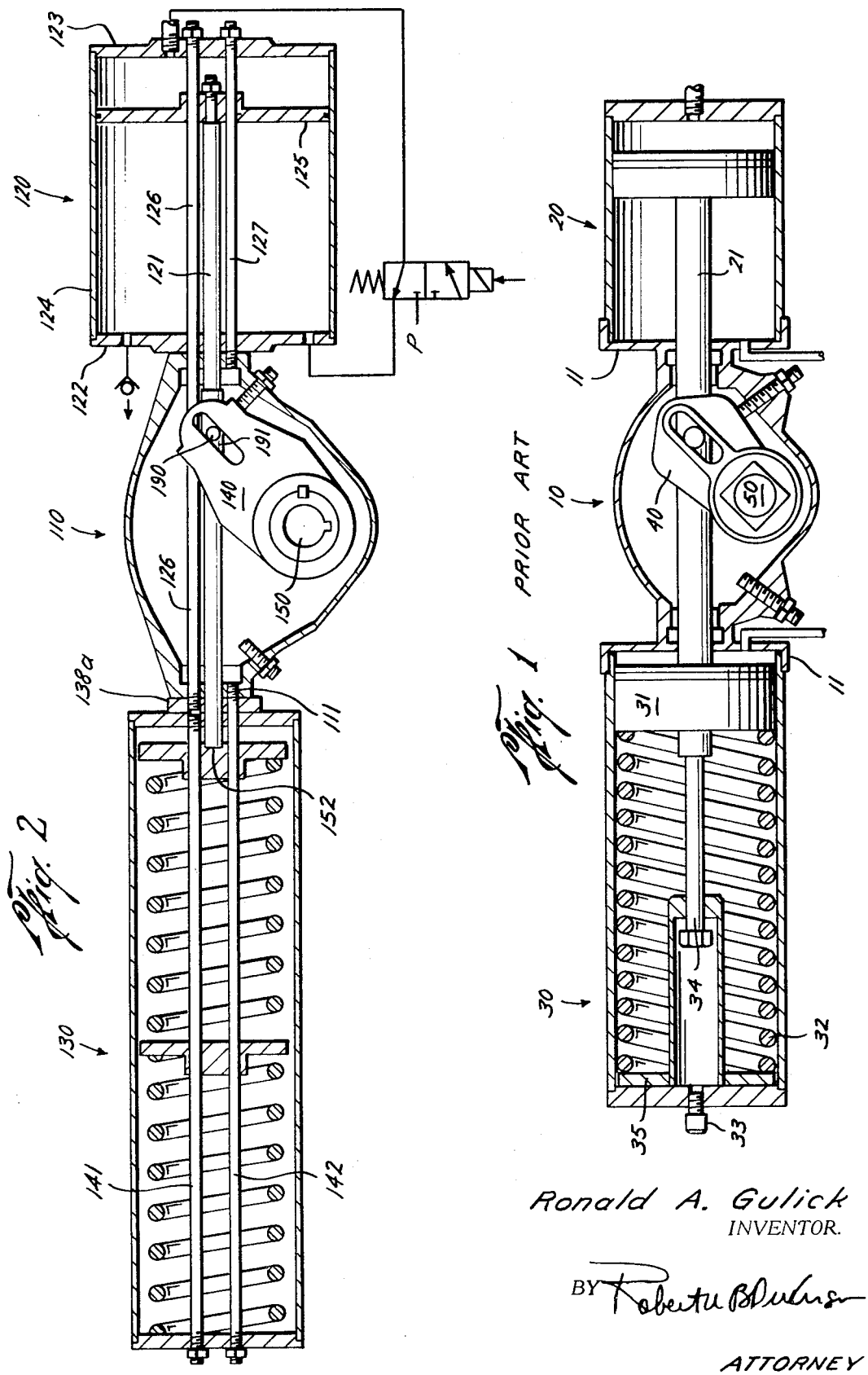

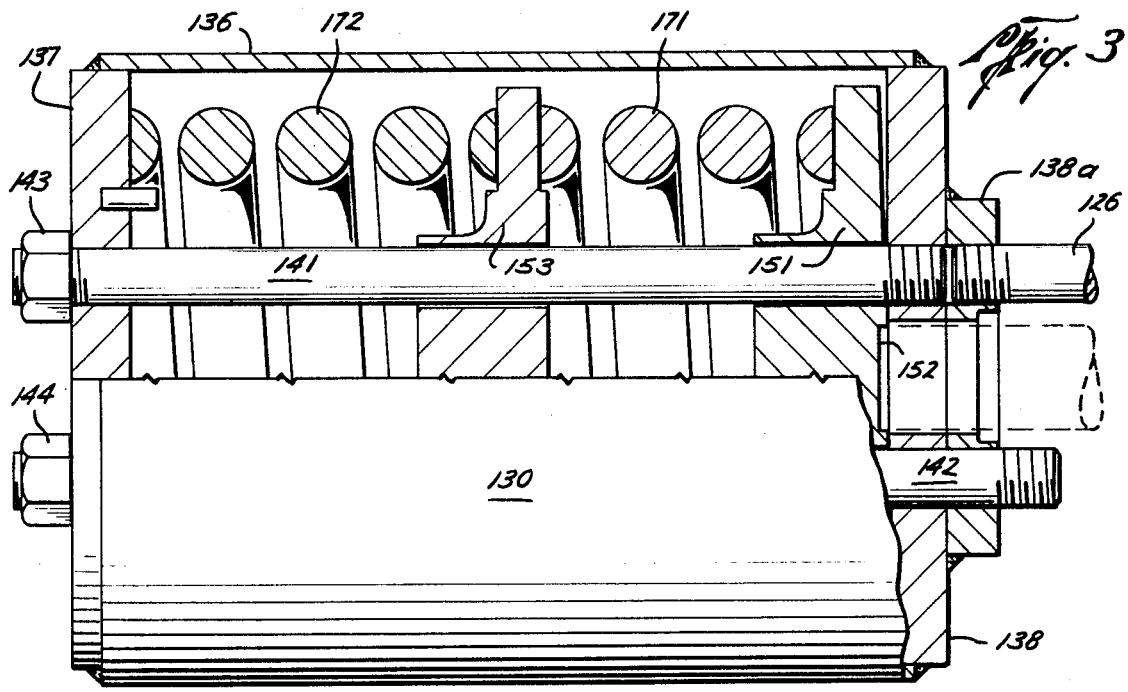
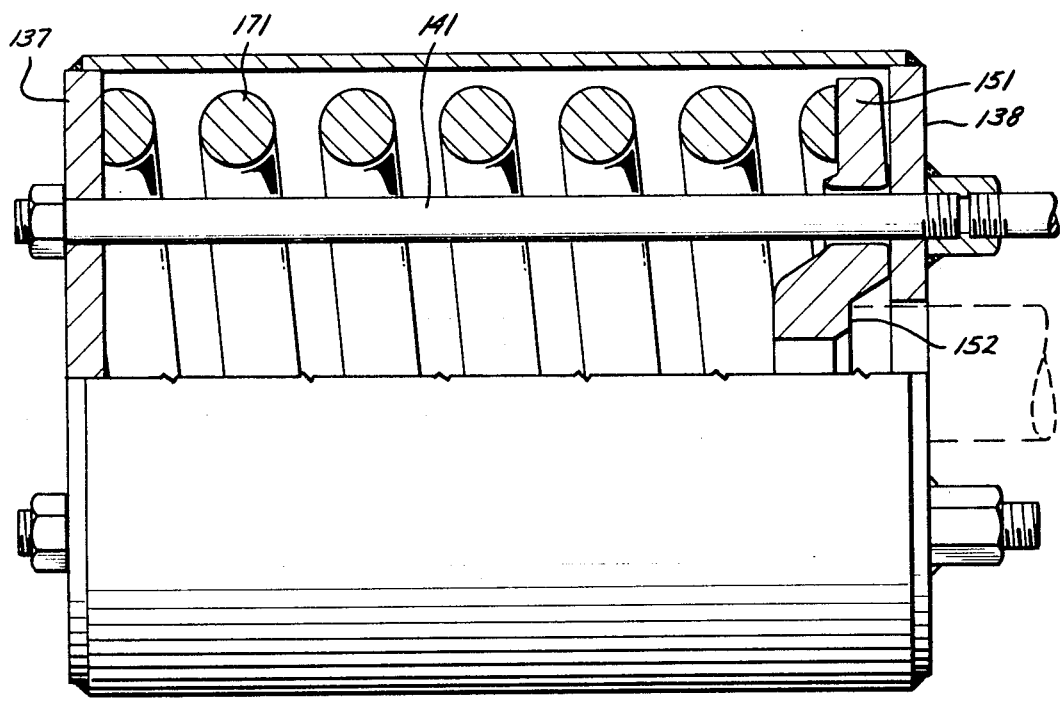

SPRING RETURN CARTRIDGE

BACKGROUND OF THE INVENTION

Actuators have long been used to cause operation of specific pieces of equipment. A typical example involves causing the opening or closing of a valve, as might be used to govern the flow of material through a pipe line. Actuators oftentimes translate reciprocatory motion, generally caused by hydraulic forces, into rotatory movement of portions of the associated equipment. Since these actuators are oftentimes placed in remote locations, such as under water, it may be necessary for the valve to be caused to assume a particular position, such as to be closed, in the event of a power failure. This has resulted in the evolution of spring-return actuators, or equivalent such fail-save devices. Even these have encountered problems, especially those caused by the necessity of evacuating compressed air or fluids during the piston stroke. This absence of pressure tightness may well result in quick corrosion or other deterioration of relatively delicate parts, such as springs. It is to this specific area of problems that this invention is directed.

SUMMARY OF INVENTION

The actuator includes a central housing as well as a pressure cylinder and a spring return cylinder. These cylinders may be removable from the housing. With respect to the spring return cylinder, it may be desirable to change the spring, perhaps because of damage thereto, or a change in the function requiring greater or lesser spring strength. Here the spring cylinder comprises an interchangeable cartridge with pre-stressed spring. Also, the absence of a reciprocating sealed piston as conventially used, reduces the displacement and thereby the need for atmospheric venting. Any necessary venting may be limited to a substantially corrosion free system.

DESCRIPTION OF THE DRAWINGS

FIG. 1 is a vertical section through an existing spring return actuator;

FIG. 2 is a vertical section through an embodiment of the invention;

FIG. 3 is a partial section through the spring cartridge of FIG. 2; and

FIG. 4 is a view similar to FIG. 3, but of a modified cartridge.

DESCRIPTION OF A PREFERRED EMBODIMENT

It may be best to describe the nature of invention by first briefly examining the existing art, and then describing this inventor's improvements thereover.

FIG. 1 depicts a commercially available actuator. Shown therein are central housing 10, pressure cylinder 20 and spring return cylinder 30. Each of these cylinders is threadedly engaged with cylinder adapters 11, which adapters are linked to the housing.

Pistons within each cylinder are linked by rod 21. As the pistons reciprocate by virtue of pressured fluid entering cylinder 20, through piping not shown, a pin affixed to rod 21 causes rotation of yoke 40 within housing 10, and thereby also causes rotation of valve stem 50 which is keyed to the yoke. As the left hand piston of FIG. 1 moves to the left, it presses against spring plate 31, which in turn compresses spring 32. The build up of potential force within the spring provides the potential impetus for urging the pistons and related yoke in the opposite direction on withdrawal of pressure — thus the fail-safe label. It is obvious that as the left hand piston moves to the left, there would be a substantial build-up of pressure in front of its leading face, were not evacuation porting provided. In this illustration, an air breather 33 to atmosphere is provided. The nature of this port is intended only to illustrate that means must be provided to compensate for the substantial volume of air or other fluids in cylinder 30 displaced by the moving piston. Spring 32 would normally be pre-compressed by utilizing rod 34 to cause the spring to be compressed between plates 35 and 31.

Now consider the changes proposed, and specifically as shown in FIGS. 2 and 3. Housing 110, illustrated only generally, has yoke 140 rotatably mounted therein. The yoke may have valve stem 150 keyed therein. Piston cylinder 120 includes outer and inner end plates 122 and 123, respectively affixed to central tube portion 124. Within this cylinder, piston 125 is affixed to the end of rod 121 by a nut. The piston is also shown to be guided by a pair of tie rods 126, 127, the piston being apertured to receive such rods therethrough. The required porting and conducts required to supply pressurized fluid behind (to the right in FIG. 2) piston 125 and cause it to move to the left, as well as the necessary evacuation, structure, is shown only schematically.

The previously mentioned tie rods not only serve to guide the piston, and may receive lateral forces therefrom, but also act as clamps to bond the cylinder together. Further, they may act, as discussed to tie together the entire actuator. Rod 126 is shown to engage one end of cylinder 120, extend therethrough, through central housing 110, to threadedly engage one end plate of spring cylinder 130. The other tie rod 127 extends from end plate 123, through cylinder 120, to terminate by threaded engagement with a lug extension of central housing 110. It is within the contemplation of this invention that combinations of the above kinds of fixing the tie rod ends may be used. Oftentimes, a change in the quantity of torque required occurs. This available torque is a function, among other variables, of the piston face area. Thus, cylinders of different diameters are oftentimes used. The arrangement described above permits quick removal, i.e, remove tie rods 126, 127, of cylinder 120, and insert another cylinder having a piston diameter of the proper size.

In the schematically illustrated pressure supply, such a supply will, during the pressure cycle provide the pressurized fluid to the right side of the pressure cylinder. Fluids in advance of moving cylinder 125 would be evacuated through an aperture controlled by a one way valve, as illustrated in FIG. 2. During the spring return phase, reentry through said aperture would be barred. Further, as the piston is caused to move to the right, the fluid being compressed thereby could be evacuated to reenter the pressure cylinder on the backside of the piston, thereby providing a power assist thereto. This portion of the cycle is illustrated. It is not believed that this particular power boost has been previously utilized.

On the other side of central housing 110 is spring return cylinder 130. The cylinder includes tube portion 136, front end plate 137 and rear end plate 138 being joined to said tube portion. Tie rods 141 and 142 are present. Upper rod 141 has one end fixed relative to end plate 137, by nut 143, the other rod end being engaged with end plate 138. Lower tie rod 142 also has one end positioned by a threaded nut, namely 144, the other end extending through plate 138.

This other end may engage a threaded top in central housing 110, such as shown at 111 in FIG. 3 clearly indicates that one end of pressure cylinder tie rod 126 may terminate in threaded engagement with plate extension 138a. Thus, the two cylinders are fixed to the central housing.

Within spring return cylinder 130, one or more spring washers 151 and 153 engage and are guided by tie rods 141, 142, the washers being apertured to permit such sliding engagement. Note that the interior of the cylinders of FIGS. 3 and 4 are generally symmetrical about their axis, so that only half need be shown in detail. FIGS. 3 and 4 illustrate that one or more such washers may be used depending on the spring force required. In FIG. 3 coiled springs 171, 172 are illustrated, the former extending between washers 151 and 153, and the latter between washer 153 and end plate 137. In FIG. 4, only one spring is required, it being positioned between washer 151 and end plate 137. Both plate 138 and extension 138a are centrally apertured to permit the passage therethrough of an end of piston rod 121. Said rod ends abuts against recessed central portion 152 of washer 151.

In actual operation an outside source of pressurized fluid, air or liquid would be provided. Such fluid would enter the right side of cylinder 120, (FIG. 2) causing piston 125 to move to the left. Along with the piston, rod 121 would also move. Pin 190, carried by the rod, by virtue of it extending through slot, or slots 191 in the arm or arms of yoke 140 would cause the yoke to rotate about its axis, and thereby rotate valve stem 150. Also, as rod 121 moves linearly and yoke 140 rotates counter clockwise in FIG. 2, the free end of rod 121 pushes washer 151 in spring return cylinder 130 in the same direction as piston 125 moves. When the pressure is removed from piston 125, either when it is desired to manipulate the valve or for some reason the pressure supply is interrupted, the force of spring 171 or 172 acts to force the spring washers in the other direction. This causes rod 121, pin 190, yoke 140 and piston 125 to move in such other direction.

The above described result is basically like that achieved by the prior art of FIG. 1. However, structural differences described permit certain added functions to be performed and benefits derived.

It has already been mentioned how the tie bar arrangement permits either or both of the cylinders to be replaced without requiring the replacement of the entire actuator. With regard to the spring return cylinder, this particularly is advantageous when varying spring strengths are required. An entire cylinder may be substituted, rather than causing a substantial dissembly of the operating actuator or the substitution of an entirely different actuator. This compact arrangement also provides for ease and safety of pre-compressing of the spring, and insertion within the cylinder tube.

Perhaps the prime advantage involves abolishing the necessity of venting the cylinder to the surrounding atmosphere. As mentioned earlier, actuators such as this may be positioned in highly corrosive locales or in position where venting may involve very costly appendages — underwater locations being a typical example. In prior art actuators such as this, pistons were used in the spring return cylinder, seals normally being provided intermediate the piston periphery and the inner tube wall. This resulted in a pressure build up adjacent to the leading piston face. Naturally, this fluid had to be evacuated, otherwise the piston advance would eventually be curtailed. So, air breathers, such as member 33 in FIG. 1 were provided to exhaust the fluid and to act as an intake during the return stroke. Atmosphere air or other ambient fluids may be highly corrosive. In this invention, the drawings clearly indicate a clearance between the washer periphery and the inner tube wall. Thus, when the washer or washers move, there is virtually no displacement of fluid, ie, there need be no exhaust provided. In actuality, inasmuch as portions of piston rod 121 do enter and leave the cartridge, there could be some small quantity of fluid displacement. This relatively insignificant amount may be compensated for by various means. For example, in the event that a liquid medium, such as an oil bath, is provided said cartridge, it could be filled to something less than capacity, leaving some room for expansion or displacement. Additionally, in view of the small amount of displaced fluid, a reservoir could be economically connected via porting and conduits to said cartridge. In either case, the circulating fluid would be relatively non corrosive in nature.

Although limited embodiments have been discussed, it should be obvious that numerous modifications would be possible by one skilled in the art without departing from the spirit of the invention, the scope of which is intended to be limited only by the following appended claims:

I claim:

1. An actuator comprising:

A central housing portion including means for causing movement of a portion of a related valve;

a pressure cylinder portion including a piston device linked to said movement causing means by a piston rod; and a spring return cylinder linked to said central housing, said spring return cylinder having a tubular portion closed at each end thereof closed to the ambient surroundings, at least one tie rod member extending through said tubular portion, a washer member slidably engaged with said tie rod member and linked to said piston rod, the configuration of said washer member permitting relatively unimpeded communication between its opposite faces, said communication permitting washer movement without pressure build up, and spring means for resisting movement by said washer member and said piston rod toward one end of said tubular portion.

2. In a valve actuator having a housing and at least one power cylinder portion attached to said housing, the improvement comprising:

a tubular portion of said cylinder, and closure members at each end thereof;

tie rod members extending through said tubular portion and at least partially through each of said closure members, at least one of said tie rod members extending substantially through said housing and being fixed thereto at its side opposite from said one power cylinder;

at least one of said tie rod members including at least one piston device slidably riding thereon;

means linking said piston to valve actuating means within said housing.

3. The actuator of claim 2 and including a further cylinder portion positioned substantially opposite from said one cylinder portion;

at least one of said tie rod members extending through one entire cylinder, substantially through said central housing and through at least a portion of one end closure of said further cylinder portion.

* * * * *